United States Patent
Kosaka et al.

(10) Patent No.: US 9,079,629 B2
(45) Date of Patent: Jul. 14, 2015

(54) BICYCLE ELECTRIC CONTROL DEVICE WITH ADJUSTABLE SWITCH UNIT

(71) Applicant: Shimano Inc., Sakai-ku, Sakai, Osaka (JP)

(72) Inventors: Kentaro Kosaka, Sakai (JP); Satoshi Shahana, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 79 days.

(21) Appl. No.: 13/687,900

(22) Filed: Nov. 28, 2012

(65) Prior Publication Data

US 2014/0144281 A1   May 29, 2014

(51) Int. Cl.
*H01H 9/00* (2006.01)
*B62K 23/06* (2006.01)
*B62M 25/08* (2006.01)

(52) U.S. Cl.
CPC ............... *B62K 23/06* (2013.01); *B62M 25/08* (2013.01); *Y10T 74/20822* (2015.01)

(58) Field of Classification Search
CPC ............ G05G 1/38; G05G 1/40; G05G 1/405
USPC .................................................. 335/205–207
See application file for complete search history.

(56) References Cited

U.S. PATENT DOCUMENTS

| | | | | |
|---|---|---|---|---|
| 6,564,694 | B2 * | 5/2003 | Zumberge et al. | 92/5 R |
| 6,569,045 | B1 * | 5/2003 | Campagnolo | 474/70 |
| 6,758,115 | B2 * | 7/2004 | Allen et al. | 74/560 |
| 7,190,260 | B2 * | 3/2007 | Rast | 340/479 |
| 7,854,180 | B2 | 12/2010 | Tetsuka | |
| 7,954,398 | B2 * | 6/2011 | Lee et al. | 74/512 |
| 8,378,673 | B2 * | 2/2013 | Huang et al. | 324/251 |
| 2002/0157497 | A1 * | 10/2002 | Porter et al. | 74/512 |
| 2003/0110879 | A1 * | 6/2003 | Massey et al. | 74/512 |
| 2006/0157028 | A1 * | 7/2006 | Lee et al. | 123/399 |
| 2008/0030188 | A1 * | 2/2008 | Ponziani et al. | 324/207.2 |
| 2009/0054182 | A1 * | 2/2009 | Miki et al. | 474/80 |

* cited by examiner

*Primary Examiner* — Alexander Talpalatski
(74) *Attorney, Agent, or Firm* — Jeffer Mangels; Butler & Mitchell LLP; Brennan C. Swain, Esq

(57) ABSTRACT

An electric control device for operating a bicycle component that includes a base member that is adapted to be attached to a bicycle, a movable member coupled to the base member and movable between a first position and a second position, a signal generating unit that generates a signal when the movable member is moved to the second position, and an adjusting structure for adjusting the distance between the first position and the second position.

19 Claims, 5 Drawing Sheets

BICYCLE ELECTRIC CONTROL DEVICE WITH ADJUSTABLE SWITCH UNIT

FIELD OF THE INVENTION

The present invention relates to a bicycle electric control device, and more specifically to a bicycle electric control device with an adjustable stroke.

BACKGROUND OF THE INVENTION

There are known bicycle control devices for controlling various aspects of the bicycle, such as shifting or braking. For example, many shifting devices are electric powered and configured such that they can be controlled electrically so as to change among a plurality of gear positions (e.g., U.S. Pat. No. 7,854,180 to Tetsuka, the entirety of which is incorporated herein by reference). These types of devices include electric switches and can be mounted to a handlebar. However, due to the differences in size of riders' hands or the preference in stroke length, it is desirable to provide adjustability of the stroke of the movable member or lever.

In view of the above, there exists a need for an improved bicycle electric control device. This invention addresses this need in the art as well as other needs, which will become apparent from this disclosure to those skilled in the art.

SUMMARY OF THE PREFERRED EMBODIMENTS

In accordance with a first aspect of the present invention there is provided an electric control device for operating a bicycle component that includes a base member that is adapted to be attached to a bicycle, a movable member coupled to the base member and movable between a first position and a second position, a signal generating unit that generates a signal when the movable member is moved to the second position, and an adjusting structure for adjusting a distance between the first position and the second position. In a preferred embodiment, the movable member comprises a lever pivotally coupled to the base member about a pivot axis and the lever returns to the first position after being moved to the second position by a biasing member that biases the lever toward the first position, and a stopper member abuts the lever to maintain the lever in the first position. In a preferred embodiment, the adjusting structure adjusts a position of the signal generating unit with respect to the movable member and/or the pivot axis of the lever.

In a preferred embodiment, the adjusting structure adjusts the position of the signal generating unit linearly with respect to the pivot axis of the lever. Preferably, the adjusting structure includes an elongated bore defined in the base member and the signal generating unit is coupled to the base member so as to be selectively moved along the elongated bore. The adjusting structure further includes a threaded fastener that extends through the elongated bore and is threaded to the signal generating unit so as to provide adjustability of the position of the signal generating unit. In another embodiment, the adjusting structure includes at least first and second adjustment openings defined in the base member and a fastener that extends through one of the first and second adjustment openings and secures the signal generating unit in a position. The position of the signal generating unit can be adjusted by extending the fastener through the other of the first and second adjustment openings.

In a preferred embodiment, the position of the signal generating unit is angularly adjustable with respect to the pivot axis of the lever. The adjusting structure includes a pivoting member pivotally connected to the base member and the signal generating unit is coupled to the pivoting member. The position of the signal generating unit is adjustable by pivoting the pivoting member. Preferably, the adjusting structure includes at least first and second adjustment openings defined in the base member and a fastener extending through one of the first and second adjustment openings so as to secure the pivoting member in a position. The position of the pivoting member can be adjusted by extending the fastener through the other of the first and second adjustment openings. In an embodiment, the pivot axis of the lever and the pivot axis of the pivoting member are co-axial. In another embodiment, the pivot axis of the lever and the pivot axis of the pivoting member are not co-axial.

In a preferred embodiment, the signal generating unit comprises a magnet positioned on the lever that is linearly adjustable with respect to the pivot axis and a magnet sensor positioned on the base member. Preferably, the magnet sensor includes an inclined sensing portion.

The invention, together with additional features and advantages thereof, may be best understood by reference to the following description.

DETAILED DESCRIPTION OF THE PREFERRED EMBODIMENTS

Figure 1A:
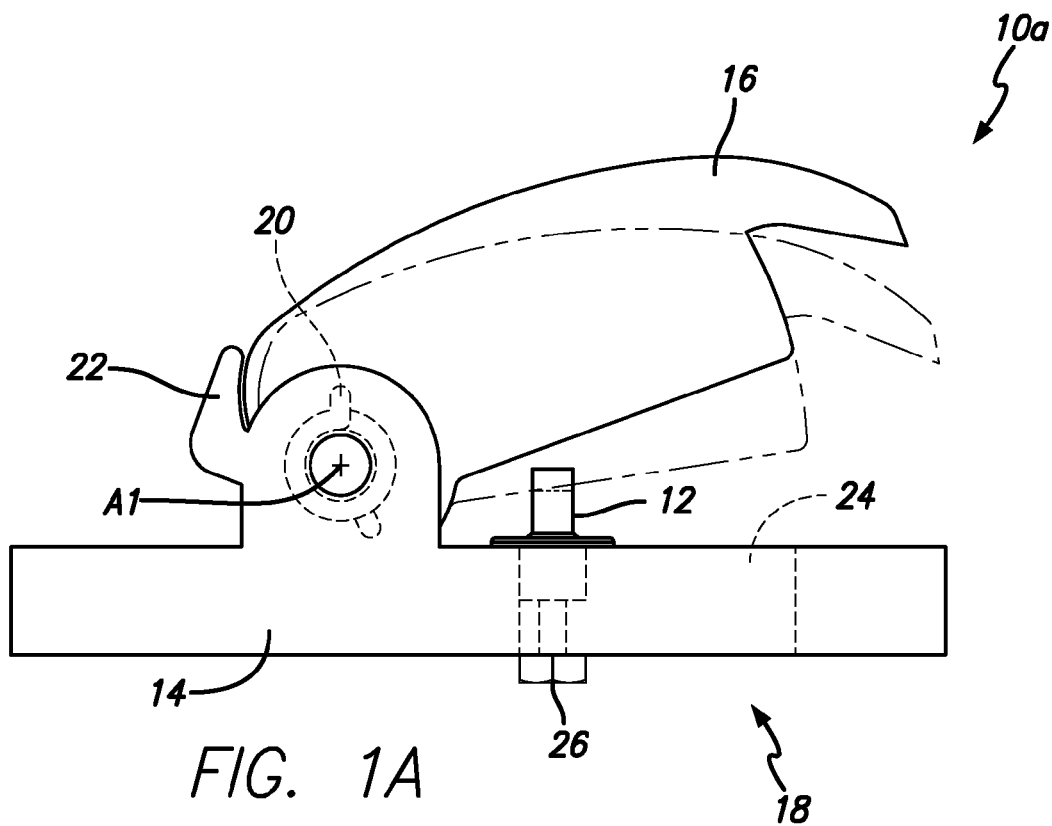
FIG. 1A is an elevational view of an electric control device for a bicycle with the lever in the first position shown in solid lines and the second position shown in phantom lines in accordance with a preferred embodiment of the present invention.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1A-5B, an electric control device 10 for operating a bicycle component, such as a derailleur or brakes, and that includes an adjustable signal generating unit or switch unit 12 is illustrated in accordance with an embodiment of the present invention. Generally, the electric control device 10 includes a base member 14 that is adapted to be attached to a bicycle, e.g. a bicycle handle bar (not shown), a movable member or lever 16 coupled to the base member 14 that is movable between a first position and a second position, the signal generating unit 12, which generates a signal when the movable member 16 is moved to the second position, and an adjusting structure 18 for adjusting the distance (or stroke) between the first position and the second position. It will be appreciated that in a preferred embodiment, the movable member is a lever. However, in another embodiment, the movable member can be another component, such as a button or the like.

Figure 1B:
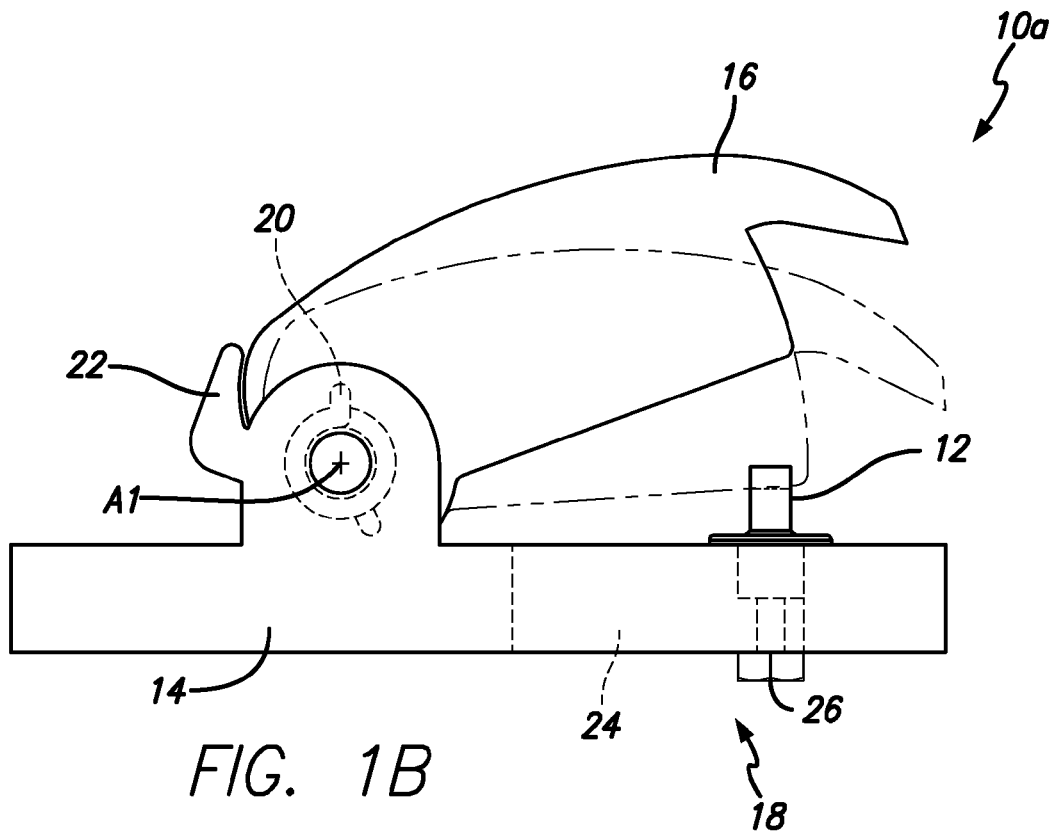
FIG. 1B is an elevational view of the electric control device of FIG. 1A with the lever in the first position shown in solid lines and the second position shown in phantom lines and showing a longer stroke than FIG. 1A.

FIGS. 1A-1B, show a preferred embodiment of an electrical control device 10a. In this embodiment, the lever 16 is pivotally coupled to the base member 14 about a pivot axis A1. The lever 16 is biased toward the first position, such that after the lever 16 is moved to the second position, it is automatically returned to the first position. Preferably, the electric control device 10a includes a biasing member 20 that biases the lever 16 toward the first position, and a stopper member 22 that abuts the lever 16 to maintain the lever in the first position when at rest. It will be appreciated by those skilled in the art that the adjusting structure 18 adjusts the position of the signal generating unit 12 with respect to the lever 16, and, more particularly, with respect to the pivot axis A1 of the lever 16. The biasing member 20 can be a torsion spring, as is shown in the figures, or any other component that biases the lever 16 to the first position. The stopper 22 can shaped as shown in the figures or any other component that abuts the lever 16 and prevents the biasing member 20 from biasing the lever 16 passed the first position.

In a preferred embodiment, the adjusting structure 18 adjusts the position of the signal generating unit 12 linearly with respect to the pivot axis A1. As shown in FIGS. 1A and 1B, in a preferred embodiment, the adjusting structure 18 includes an elongated bore 24 defined in the base member 14. The signal generating unit 12 is coupled to the base member 14 and can be selectively moved along or positioned along the elongated bore 24. Preferably, the adjusting structure 18 includes a fastener 26 that is received in an opening in the signal generating unit 12. To adjust the position of the signal generating unit 12, the fastener 26 is loosened, the signal generating unit 12 is moved along the elongated bore 24 and the fastener 26 is retightened when the desired position is reached. FIGS. 1A and 1B show the signal generating unit 12 positioned at opposite ends of the elongated bore 24. In another embodiment, the fastener 26 is integral with the signal generating unit 12 and extends through the elongated opening 24 and a nut is received on the end of the fastener 26 to secure it in position.

Figure 2A:
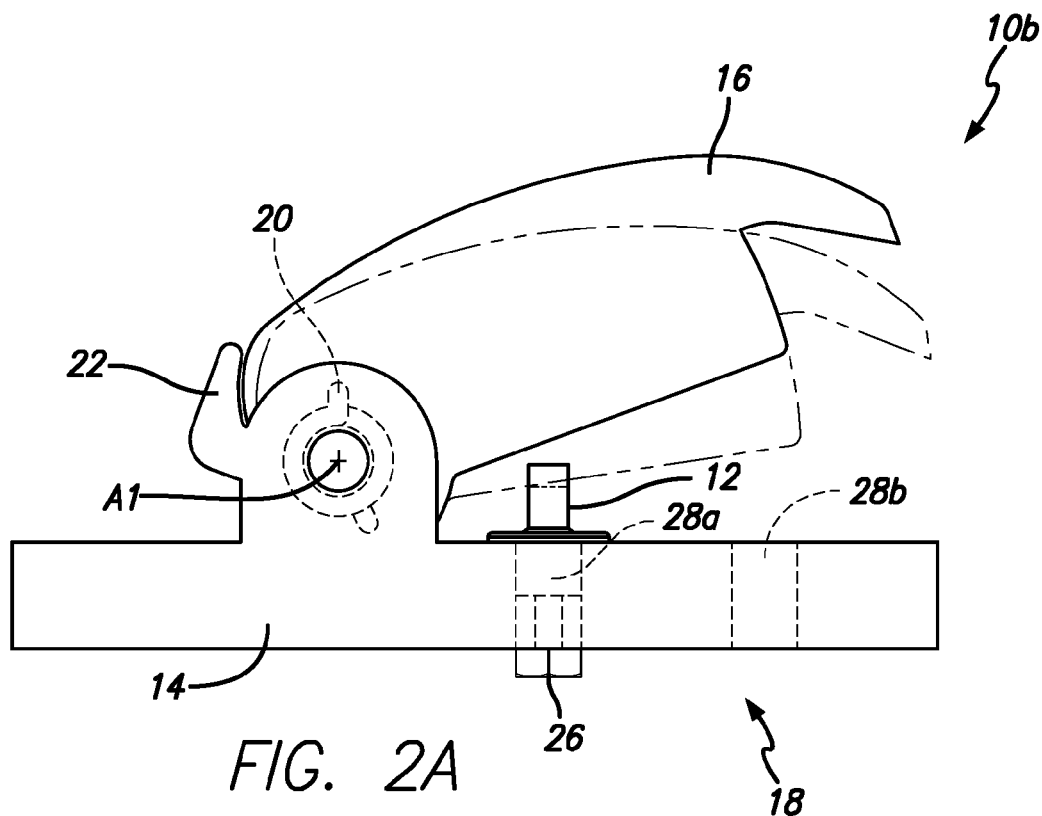
FIG. 2A is an elevational view of an electric control device for a bicycle with the lever in the first position shown in solid lines and the second position shown in phantom lines in accordance with another preferred embodiment of the present invention.
Figure 2B:
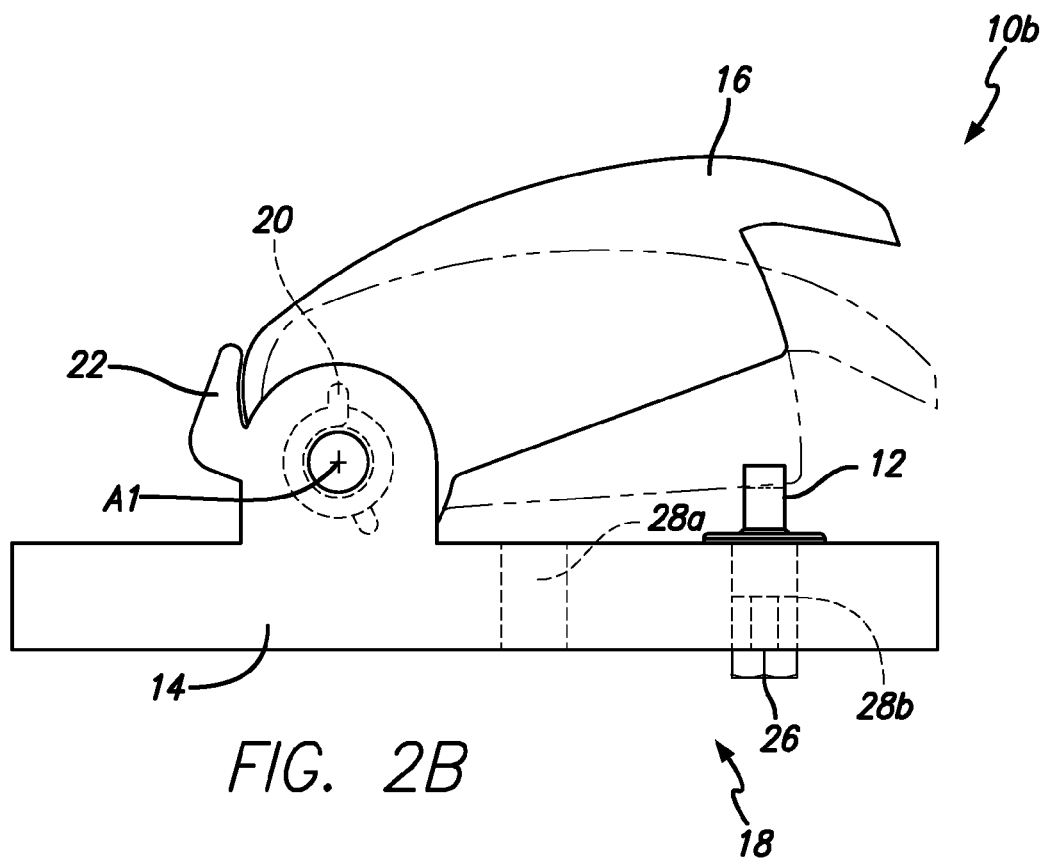
FIG. 2B is an elevational view of the electric control device of FIG. 2A with the lever in the first position shown in solid lines and the second position shown in phantom lines and showing a longer stroke than FIG. 2A.

FIGS. 2A-2B show another preferred embodiment of an electrical control device 10b that includes an adjusting structure 18 that provides linear adjustment of the position of the signal generating unit 12. In this embodiment, the adjusting structure 18 includes at least first and second adjustment openings 28a and 28b defined in the base member 14. The adjusting structure 18 can include more than two adjustment openings. In this embodiment, the fastener 26 extends through one of the first and second adjustment openings 28a and 28b and secures the signal generating unit 12 in a position. The position of the signal generating unit 12 can be adjusted by extending the fastener 26 through the other of the first and second adjustment openings 28a and 28b. Preferably, the fastener 26 extends through the first or second adjustment openings 28a and 28b and into an opening in the signal generating unit 12. In another embodiment, the fastener 26 is integral with the signal generating unit 12 and extends through the first or second adjustment openings 28a and 28b and a nut is received on the end of the fastener 26 to secure it in position.

It will be understood that, as shown in FIGS. 1A and 1B and FIGS. 2A and 2B, adjusting the position of the signal generating unit 12, changes the distance that the lever 16 has to be pressed or moved to press the switch or otherwise cause the signal generating unit 12 to generate a signal and to cause the electronic control device 10 to perform an operation, such as shifting a derailleur. This distance is known in the art as "stroke." In other words, the adjustment of the position of the signal generating unit 12 adjusts the stroke between the first position and the second position.

Figure 3A:
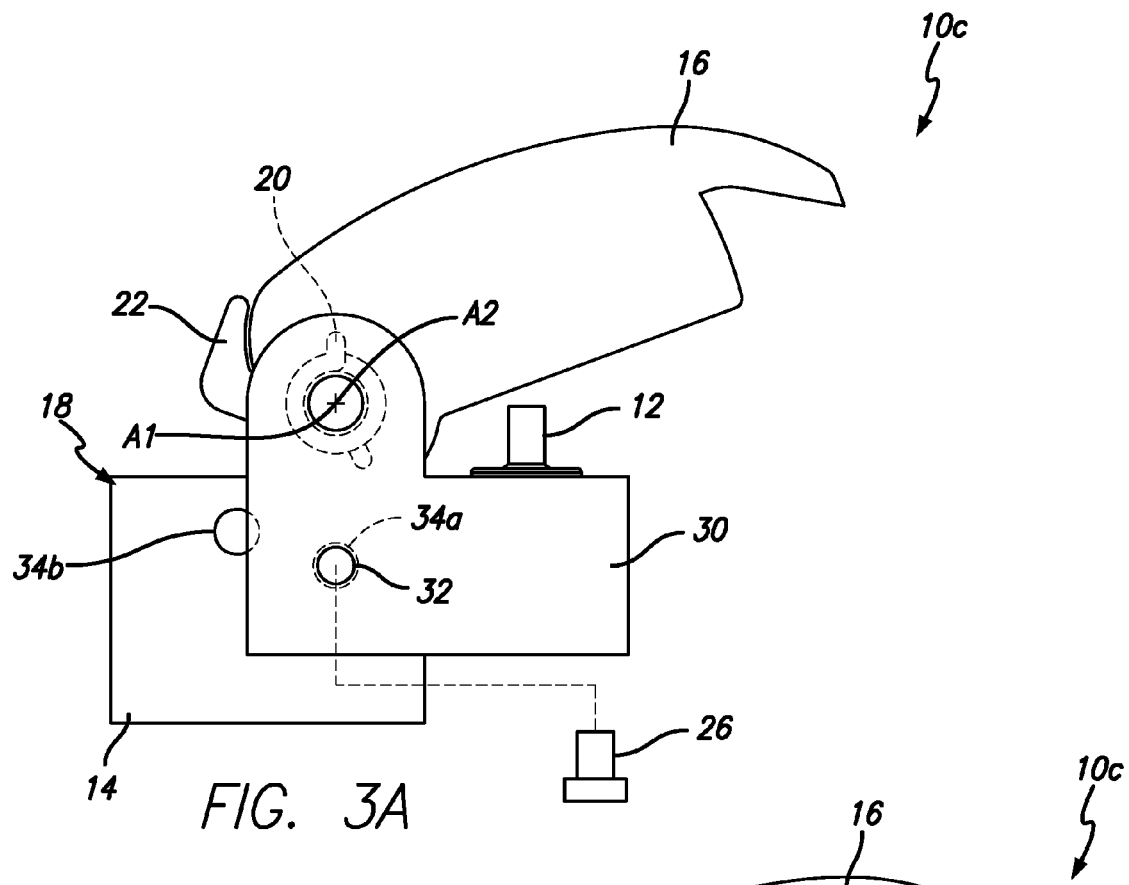
FIG. 3A is an elevational view of an electric control device for a bicycle in accordance with another preferred embodiment of the present invention.
Figure 3B:
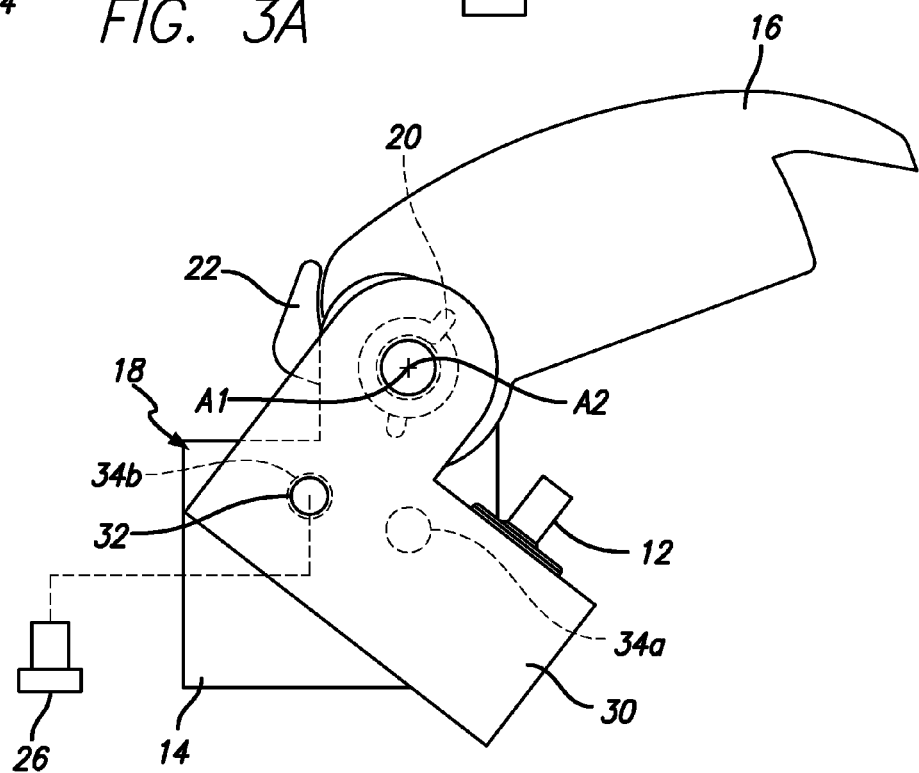
FIG. 3B is an elevational view of the electric control device of FIG. 3A, and showing a longer stroke than FIG. 3A.

FIGS. 3A and 3B show another preferred embodiment of an electrical control device 10c. In this embodiment, the position of the signal generating unit 12 is angularly adjustable with respect to the pivot axis A1 of the lever 16. In this embodiment, the adjusting structure 18 includes a pivoting member 30 that is pivotally connected to the base member 14 along the same axis as the pivot axis A1. The signal generating unit 12 is coupled to the pivoting member 30. The position of the signal generating unit 12 is adjustable by pivoting the pivoting member 30. In a preferred embodiment, the pivoting member 30 includes a through opening 32 defined therein through which a fastener 26 extends. The base member 14 includes at least two adjustment openings 34a and 34b defined therein. As shown in FIG. 3A, to position the pivoting member 30 in a first position, the fastener 26 is extended into through opening 32 and into the first adjustment opening 34a. To position the pivoting member 30 in a second position, the fastener 26 is extended into through opening 32 and into the second adjustment opening 34b. More adjustment openings are within the scope of the present invention. As shown in FIGS. 3A and 3B, in this embodiment, the pivot axis A1 of the lever 16 and the pivot axis A2 of the pivoting member 30 are co-axial.

It will be appreciated that the fastener can be secured within through opening 32 and one of first or second adjustment openings 34a and 34b in any number of ways. For example, the first and second adjustment openings 34a and 34b and fastener 26 can be threaded. In another embodiment, fastener 26 can be spring biased inwardly. In this embodiment, to adjust the position of pivoting member 30, fastener 26 is pulled out of first adjustment openings 34a, pivoting member 30 is pivoted and fastener 26 is placed in second adjustment opening 34b by allowing the spring or the like to bias it therein.

In this embodiment, by pivoting the pivot member 30, as is shown in FIGS. 3A and 3B, the distance lever 16 has to be pressed or moved to press the switch or otherwise cause the signal generating unit 12 to generate a signal is changed. In other words, the pivoting of the pivot member 30 adjusts the stroke between the first position and the second position.

Figure 4A:
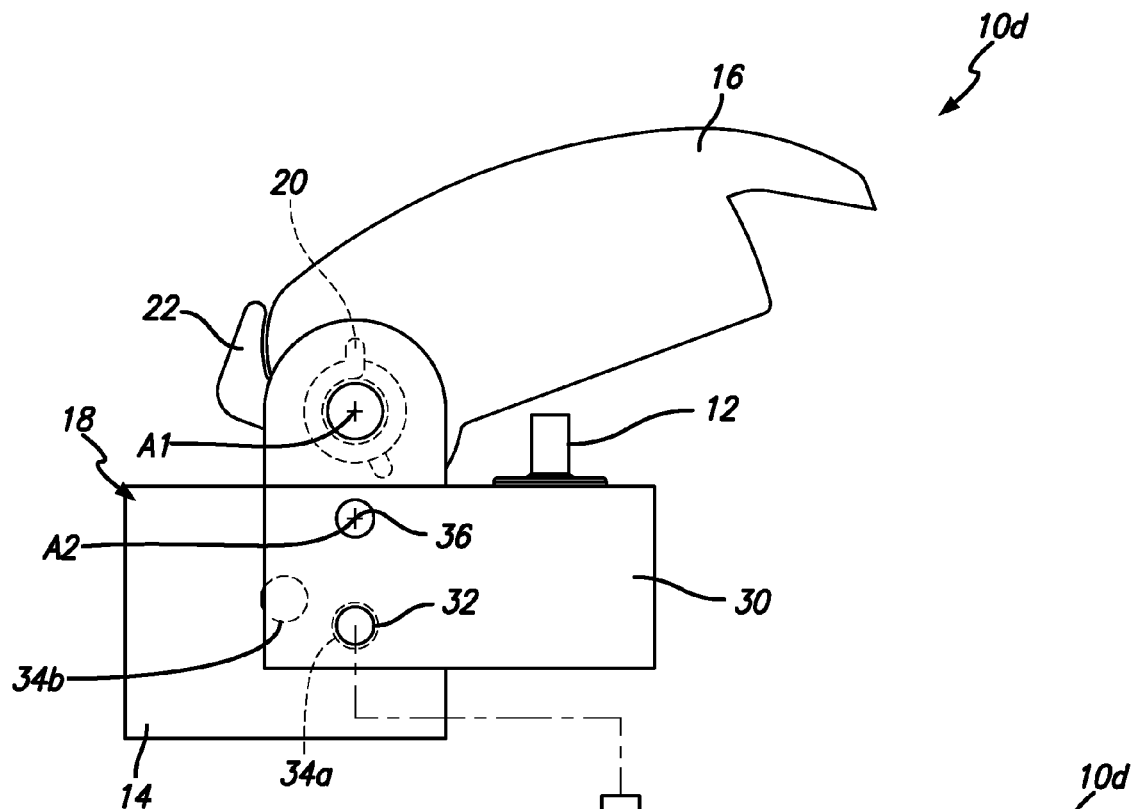
FIG. 4A is an elevational view of an electric control device for a bicycle in accordance with another preferred embodiment of the present invention.
Figure 4B:
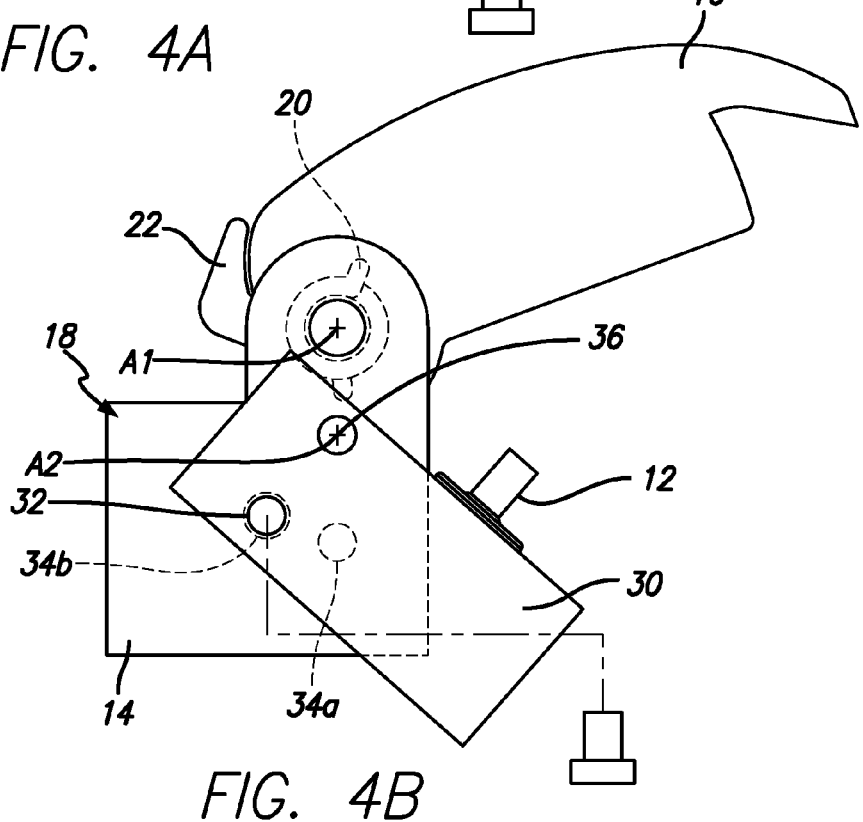
FIG. 4B is an elevational view of the electric control device of FIG. 4A and showing a longer stroke than FIG. 4A.

FIGS. 4A and 4B show another preferred embodiment of an electric control device 10d where the position of the signal generating unit 12 is angularly adjustable with respect to the pivot axis A1 of the lever 16. In this embodiment, the adjusting structure 18 includes at least first and second adjustment openings 34a and 34b defined in the base member 14 and fastener 26 extending through one of the first and second adjustment openings 34a and 34b so as to secure the pivoting member 30 in a position. Once again, the position of the pivoting member 30 can be adjusted by extending the fastener 26 through the other of the first and second adjustment openings 34a and 34b. However, in this embodiment, the pivot axis A1 of the lever 16 and the pivot axis A2 of the pivoting member 30 are not co-axial. Pivoting member 30 can pivot on a pin 36 or the like. More adjustment openings are within the scope of the present invention.

In this embodiment, by pivoting the pivot member 30, as is shown in FIGS. 4A and 4B, the distance lever 16 has to be pressed or moved to press the switch or otherwise cause the signal generating unit 12 to generate a signal is changed. In other words, the pivoting of the pivot member 30 adjusts the stroke between the first position and the second position.

Figure 5A:
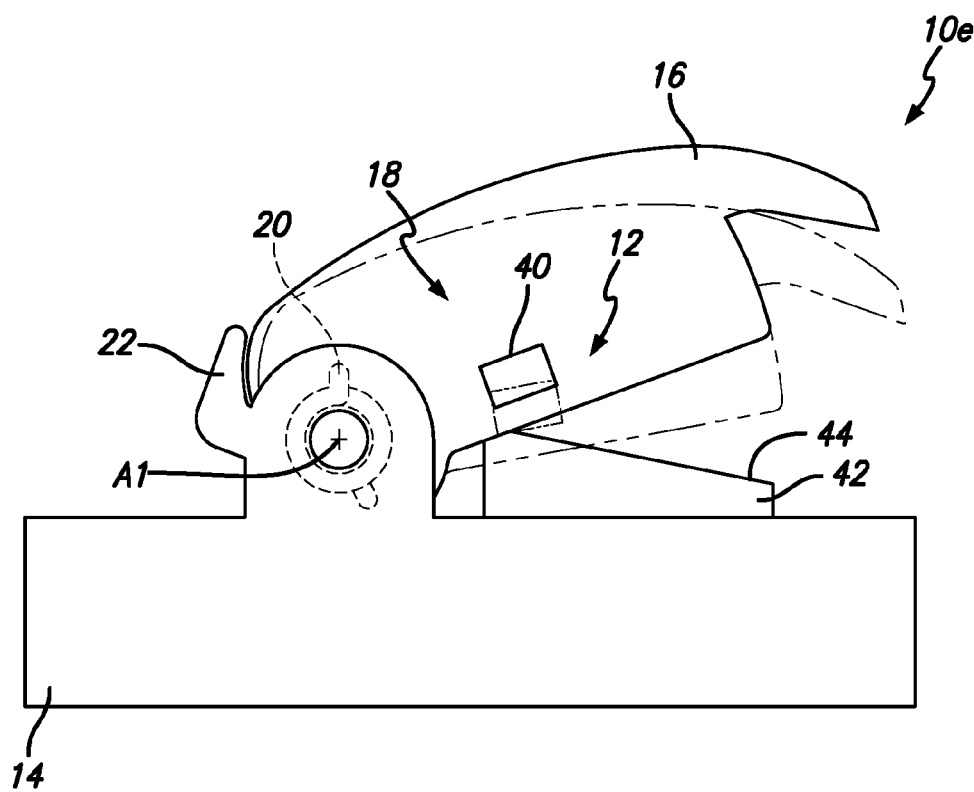
FIG. 5A is an elevational view of an electric control device for a bicycle with the lever in the first position shown in solid lines and the second position shown in phantom lines in accordance with another preferred embodiment of the present invention.
Figure 5B:
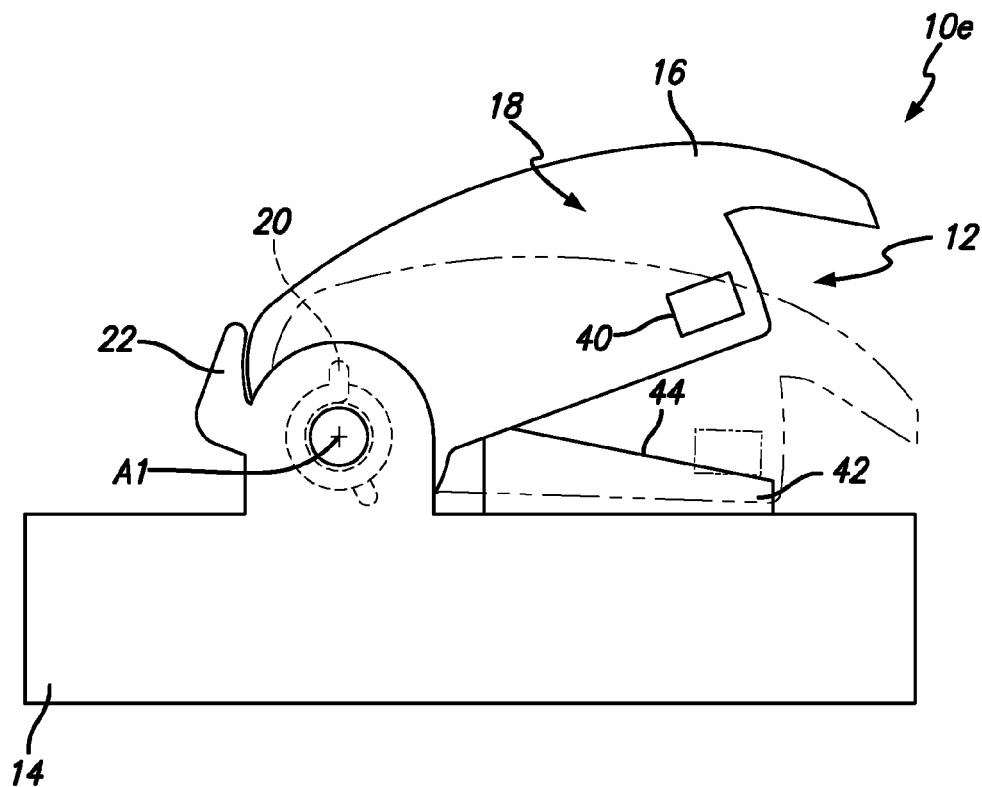
FIG. 5B is an elevational view of the electric control device of FIG. 5A with the lever in the first position shown in solid lines and the second position shown in phantom lines and showing a longer stroke than FIG. 5A.

FIGS. 5A and 5B show another preferred embodiment of an electric control device 10e where the position of the signal generating unit 12 is linearly adjustable with respect to the pivot axis A1 of the lever 16. In this embodiment, the signal generating unit 12 comprises a magnet 40 that is positioned on and is linearly movable along the lever 16. A magnet sensor 42 is positioned on the base member 14. The adjusting structure 18 provides for linear movement of the magnet 40. Any way for moving the magnet is within the scope of the present invention. For example, there can be a tab that is attached the magnet 40 and extends out of a slot in the side of the lever. Movement of the tab within the slot can adjust the position of the magnet 40.

As will be appreciated by those skilled in the art, a signal is generated and an operation, such as shifting, is performed when the magnet 40 comes into close enough proximity with the magnet sensor 42 that the magnet 40 is sensed. The position where the magnet 40 is first sensed by the magnet sensor 42 and the operation is performed is referred to herein as the sensing position (and corresponds to the second position of the lever 16). The magnet 40 is shown in the sensing position in phantom lines in FIGS. 5A and 5B.

As is shown in FIGS. 5A and 5B, in a preferred embodiment, the magnet sensor 42 includes an inclined upper surface 44 or an inclined sensing portion (e.g., the sensing portion may be inclined, but positioned in a housing that does not include an inclined surface). Due to this incline, the distance that the lever 16 has to be moved to bring the magnet 40 into the sensing position is less when the magnet 40 is positioned closer to the pivot axis A1 (see FIG. 5A) than when the magnet 40 is positioned further from the pivot axis A1 (see FIG. 5B). Therefore, the stroke is shorter in FIG. 5A than in FIG. 5B. In other words, the distance between the first position and the second position is shorter in FIG. 5A than in FIG. 5B.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" or "element" when used in the singular can have the dual meaning of a single part or a plurality of parts. As used herein to describe the above embodiment(s), the following directional terms "rearward," "rightward," "leftward," "outward," "forward," "inward," "downward," "upward," "above," "below," "vertical," "horizontal," and "transverse" as well as any other similar directional terms refer to those directions of a bicycle equipped with the bicycle control device. Accordingly, these terms, as utilized to describe the bicycle control device should be interpreted relative to a bicycle equipped with the bicycle control device as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. Any claims intended to be treated under 35 U.S.C. §112, ¶6 will begin with the words "means for". Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An electric control device for operating a bicycle component, the electric control device comprising:
   a base member that is adapted to be attached to a bicycle,
   a lever pivotally coupled to the base member about a pivot axis and pivotable between a first position and a second position, and
   a signal generating unit that includes a switch that generates a signal when the lever is moved to the second position, wherein the signal generating unit is adjustable between at least a first adjustment position and a second adjustment position, wherein in the first adjustment position the distance between the first position and the second position defines a first stroke and in the second adjustment position the distance between the first position and the second position defines a second stroke, and wherein the second stroke is greater than the first stroke.

2. The electric control device of claim 1 wherein the switch is contacted by the lever when the lever is moved to the second position thereby generating the signal.

3. The electric control device of claim 2 wherein the lever returns to the first position after being moved to the second position.

4. The electric control device of claim 1 further comprising a biasing member that is co-axial with the pivot axis and biases the lever toward the first position, and a stopper member abutting the lever to maintain the lever in the first position.

5. The electric control device of claim 1 wherein the signal generating unit is adjustable between at least the first adjustment position and the second adjustment position along a linear adjustment path.

6. The electric control device of claim 5 wherein the adjustment path is generally perpendicular to the pivot axis of the lever.

7. The electric control device of claim 1 wherein the lever pivots directly toward the switch.

8. The electric control device of claim 5 wherein the base member includes an elongated bore defined therein that extends in a direction that is generally parallel to the adjustment path, wherein the switch is movable along the elongated bore between at least the first adjustment position and the second adjustment position.

9. The electric control device of claim 8 further including a threaded fastener that extends through the elongated bore and is threaded to the signal generating unit so as to provide adjustability of the position of the signal generating unit between the first adjustment position and the second adjustment position.

10. The electric control device of claim 7 wherein the adjusting structure includes at least first and second adjustment openings defined in the base member, wherein a fastener extends through one of the first and second adjustment openings and secures the signal generating unit in a position, whereby the position of the signal generating unit can be adjusted by extending the fastener through the other of the first and second adjustment openings.

11. The electric control device of claim 6 wherein the position of the signal generating unit is angularly adjustable with respect to the pivot axis of the lever.

12. The electric control device of claim 11 wherein the adjusting structure includes a pivoting member pivotally connected to the base member, wherein the signal generating unit is coupled to the pivoting member, and wherein the position of the signal generating unit is adjustable by pivoting the pivoting member.

13. The electric control device of claim 12 wherein the adjusting structure includes at least first and second adjustment openings defined in the base member and a fastener extending through one of the first and second adjustment openings so as to secure the pivoting member in a position, whereby the position of the pivoting member can be adjusted by extending the fastener through the other of the first and second adjustment openings.

14. The electric control device of claim 13 wherein the adjusting structure further includes a through opening defined in the pivoting member, wherein the fastener extends through the through opening.

15. The electric control device of claim 12 wherein the pivot axis of the lever and the pivot axis of the pivoting member are co-axial.

16. The electric control device of claim 12 wherein the pivot axis of the lever and the pivot axis of the pivoting member are not co-axial.

17. The electric control device of claim 2 wherein the signal generating unit comprises a magnet positioned on the lever that is linearly adjustable with respect to the pivot axis and a magnet sensor positioned on the base member.

18. The electric control device of claim 17 wherein the magnet sensor includes an inclined sensing portion.

19. The electric control device of claim 2 wherein the switch is a push-button switch.

* * * * *